May 9, 1961 D. F. THOMAS 2,983,479
DISCHARGE VALVE AND OPERATING MECHANISM
Filed Sept. 11, 1958 2 Sheets-Sheet 1

INVENTOR,
DAVID F. THOMAS.
BY
ATTORNEY

May 9, 1961 D. F. THOMAS 2,983,479
DISCHARGE VALVE AND OPERATING MECHANISM
Filed Sept. 11, 1958 2 Sheets-Sheet 2
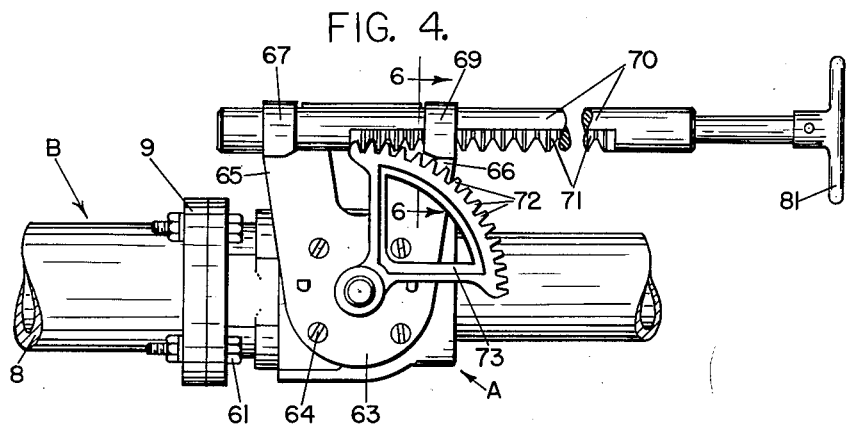
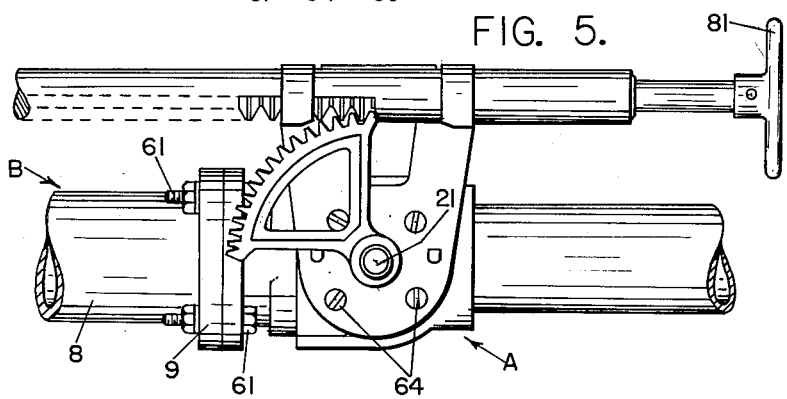
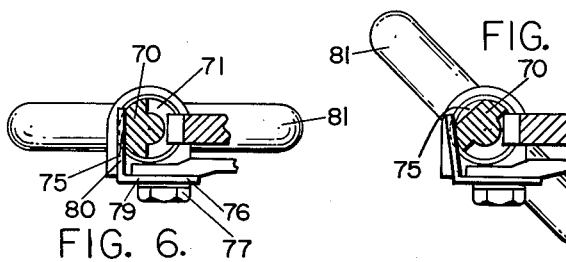
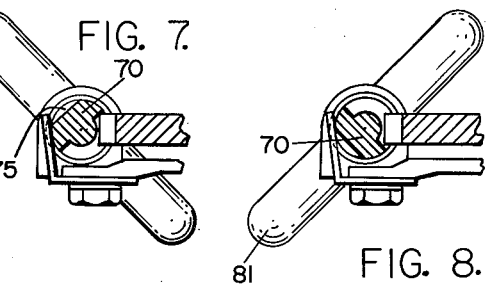
INVENTOR,
DAVID F. THOMAS.
BY *Robert M. Dunning*
ATTORNEY

United States Patent Office 2,983,479
Patented May 9, 1961

2,983,479

DISCHARGE VALVE AND OPERATING MECHANISM

David F. Thomas, St. Paul, Minn., assignor to Waterous Company, St. Paul, Minn., a corporation of Minnesota Filed Sept. 11, 1958, Ser. No. 760,455

7 Claims. (Cl. 251—250)

This invention relates to an improvement in a combined discharge valve and operating mechanism therefor, and deals particularly with a ball type valve and an apparatus for controlling the position of the valve.

In a previous patent to David F. Thomas et al., Number 2,800,295, a ball type valve was described in which the ball element was assembled into a valve housing and operated by a detachable valve stem mechanism. While this valve has functioned very effectively for its intended purpose, it was somewhat expensive to produce and market. Accordingly, certain improvements have been made and these improvements are incorporated in the present application.

A feature of the present invention resides in the provision of a mechanism for controlling the position of the valve which includes a gear segment and a slidable rack engageable with the segment. The gear rack is generally cylindrical in form but is provided with a flat side extending longitudinally of the rack. Spring means are provided which may engage against the flat side of the rack or may engage against the cylindrical surface thereof. By rotating the rack about its axis until the flat side is in registry with the spring means, the rack may be easily moved in a longitudinal direction to operate the gear segment connected to the valve stem. By rotating the rack about its axis until the rounded surface thereof engages the spring means, the rack is effectively held by friction from longitudinal movement, thus locking the gear segment in a selected position.

A further feature of the present invention lies in the provision of a rack which is generally cylindrical in cross section and which is provided with teeth which extend over perhaps one-half of the circumference of the cylindrical body. Thus, the rack teeth engage the gear segment regardless of the rotative position of the rack within predetermined limits.

A further feature of the construction described lies in the fact that the position of the gear segment may be adjusted on the valve stem so that the valve may be opened by longitudinal movement of the rack in one direction or by longitudinal movement of the rack in the opposite direction as desired.

A further feature of the present invention resides in the manner in which the valve body may be connected to a pump housing or other member with which the valve is used. The inlet end of the valve consists of a sleeve having a series of radially projecting angularly spaced lugs thereupon. The valve attaching flange is a ring shaped member designed to fit over the sleeve and having a series of inwardly projecting lugs which are angularly spaced similarly to the outwardly projecting lugs on the sleeve. The lugs on the sleeve and flange are somewhat narrower than the spaces between the lugs. Thus, the ring shaped flange may be moved over the sleeve with the lugs of the sleeve moved out of registry with the lugs on the flange and by relative rotation between the two parts, the lugs on the flange body may be interengaged with the lugs on the sleeve to hold the two parts connected.

This arrangement is of importance as it permits the flange to be loosely mounted upon the pump or other mounting member by means of angularly spaced bolts. The valve may then be attached to the pump or other mounting member by inserting the sleeve through the flange and rotating the valve body until the lugs interengage. The bolts may then be tightened to secure the valve to the pump. This arrangement has the advantage of permitting a shorter overall length between the valve housing and the mounting flange due to non-interference of the attaching bolts with the valve body during assembly. Furthermore, this arrangement permits the valve to be adjusted in angular position a few degrees if such adjustment is desired. Furthermore, the loose flange may be produced of cheaper material than the seal retainer often used in such installations.

These and other objects and novel features of the present invention will be more clearly and fully set forth in the following specification and claims.

In the drawings forming a part of the specification:

Figure 4 is a plan view of the valve and its operating mechanism.

Figure 5 is a view similar to Figure 4 showing the valve in the opposite extreme position from that illustrated in Figure 4.

Figure 6 is a sectional view through a portion of the valve operating mechanism, the position of the section being indicated by the line 6—6 of Figure 4.

Figure 7 is a view similar to Figure 6 showing the valve operating mechanism in a different rotative position.

Figure 8 is a view similar to Figure 7, showing the valve operating mechanism in another rotative position.

The valve is indicated in general by the letter A and in actual practice is usually used as a discharge valve to control the flow of water from a centrifugal fire pump or the like. Figures 4 and 5 of the drawings disclose an end portion of the pump B which forms the pump outlet passage 8 and is provided with a peripheral flange 9 at its outer extremity to which the valve A is attached.

Figure 1:
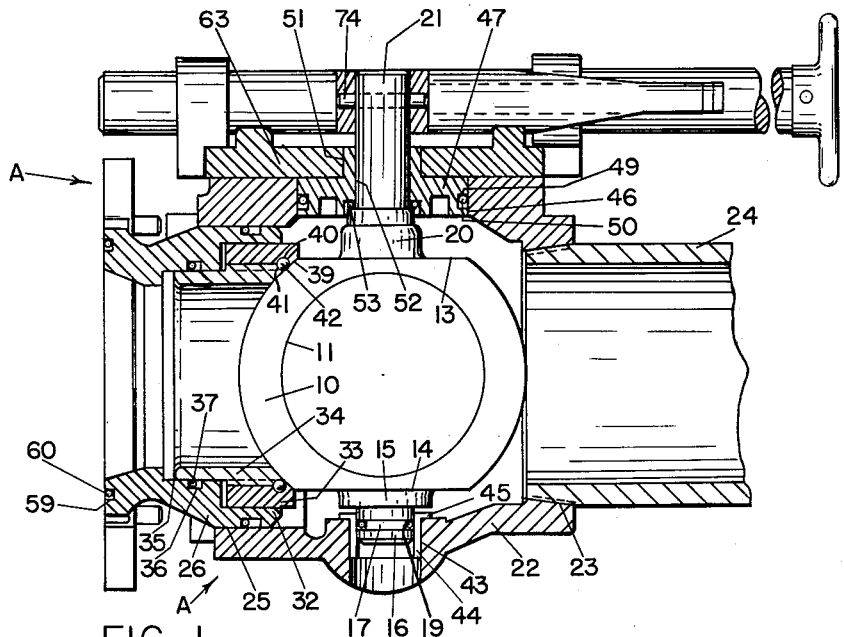
Figure 1 is a vertical sectional view through the valve and operating mechanism illustrating the general arrangement of parts.

With reference to Figure 1 of the drawings, it will be noted that the valve A includes a rotatable ball shaped valve element 10 having an axial aperture 11 extending therethrough. The ball 10 is shown as having substantially flat parallel upper and lower surfaces 13 and 14 respectively. Projecting in a radial direction from the flat surfaces 14 is a boss 15 having a reduced diameter end 16. This reduced diameter end 16 is grooved as indicated at 17 to accommodate a sealing ring 19.

The ball valve element 10 also includes a radially extending boss 20 terminating in a reduced diameter portion 21 which forms the valve stem. The bosses 15 and 20 are coaxial and the axes thereof extend through the center of the ball surface of the ball valve element 10.

The element 10 is normally enclosed within a housing including a main body portion 22. This housing 22 includes an internally threaded outlet opening 23 which is designed to accommodate the outlet pipe or sleeve 24 which, in the environment in which it is usually used, includes a means of attachment with a fire hose. Opposite the opening 23 is provided a cylindrical passage 25 within which the inlet fittings which will be described are supported.

Figure 3:
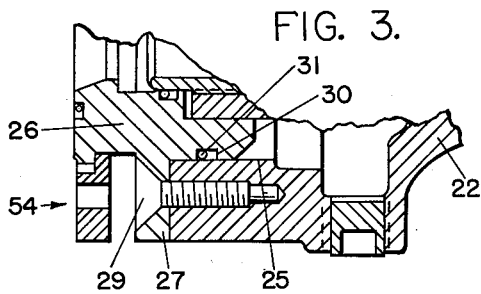
Figure 3 is a sectional detail through a portion of the valve, the position of the section being indicated by the line 3—3 of Figure 2.

The inlet fittings include a sleeve 26 having an outer diameter of proper size to slidably fit within the cylindrical passage 25. As indicated in Figure 3 of the drawings, the sleeve 26 is provided with angularly spaced outwardly projecting ears or lugs 27 which overlie the end of the valve housing 22. Machine screws 29 extend through the ears 27 and are threaded into the portion of the valve housing encircling the cylindrical passage 25. The exterior surface of the ring 26 is grooved as indicated at 30 to accommodate a sealing ring 31 which acts to form a seal between the sleeve 26 and the inlet end of the housing 22.

A ball seal is slidably supported within a cylindrical recess 32 in the inner end of the sleeve 26. The ring seal includes an outer ring 33 which is slidably supported in the cylindrical recess 32 and an inner ring 34 which is somewhat longer than the outer ring 33 and which lies within a portion of the ring 26 which is of somewhat smaller internal diameter and which is indicated at 35. This inner surface 35 is peripherally grooved as indicated at 36 to accommodate a sealing ring 37 which forms a seal between the inner ring 34 and the valve housing. The outer ring 33 is internally threaded and the inner ring 34 is externally threaded to permit these parts to be securely engaged together.

As indicated at 39, the inner ends of the rings 33 and 34 are beveled to fit closely against the surface of the ball valve element 10. Cooperable opposed grooves 40 and 41 are provided in the adjoining surfaces of the rings 33 and 34 adjacent the beveled ends 39 of these rings. A sealing ring 42 is supported in the grooves 40 and 41 and is held firmly in place in the grooves when the two rings 33 and 34 are properly positioned. The ring 42 may be inserted in the outer groove 40 while the two rings are partially threaded apart and by rotating one ring relative to the other until the grooves 40 and 41 are opposed, the sealing ring 42 is securely anchored in position to project slightly from the beveled surface 40 of the ring. In this position, the sealing ring engages against the surface of the ball valve element 10.

A cylindrical passage 43 having is axis on the plane of the axes of the inlet and outlet and in right angular relation thereto is designed to accommodate a bearing 44 having a flange 45 at its upper extremity to limit outward movement of the bearing. The bearing 44 rotatably supports the small diameter end 16 of the boss 15 and the seal 19 acts between the boss 16 and the bearing 44. The housing 22 is provided with a cylindrical aperture 46 extending therethrough in axial alignment with the aperture 43, the passage 46 being of substantially larger diameter than the passage 43. A ring shaped closure plate 47 fits in the cylindrical recess 46 to act as a closure therefor. The plate 47 is grooved as indicated at 49 to accommodate a sealing ring 50. The plate 47 is provided with a central upwardly projecting boss 51 having a cylindrical passage 52 therethrough designed to accommodate the valve stem 21. A sealing ring 53 is interposed between the plate 47 and the stem 21 to form a watertight seal between these parts.

Figure 2:
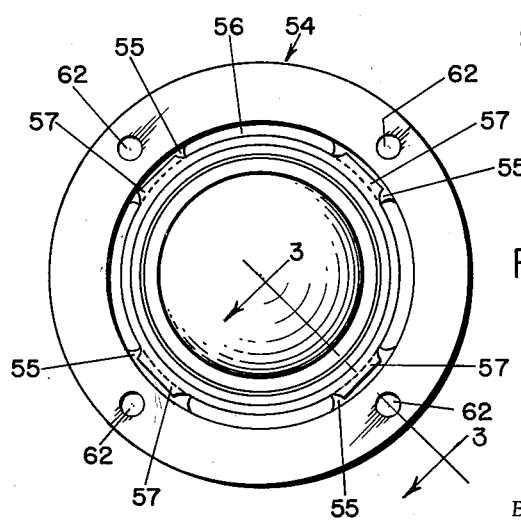
Figure 2 is an end elevational view of the inlet end of the valve, the portions of the valve in the background being omitted to simplify the showing.

As is best indicated in Figures 2 and 3 of the drawings, the valve A is connected to the flange 9 of the pump discharge pipe 8 by means of a ring-shaped flange 54 having a series of angularly spaced inwardly projecting lugs 55 forming a part thereof. The inlet sleeve 26 is provided with a generally cylindrical outer extremity 56 having a series of angularly spaced outwardly projecting lugs 57 thereupon. The lugs 55 are narrower than the spaces between adjacent lugs so that the flange 54 may be attached or detached by rotating the flange relative to the sleeve until the lugs or projections 55 and 57 are out of registry. When the lugs are in registry, the lugs 55 on the flange 54 lock behind the lugs 57 on the sleeve 26 to hold the parts connected.

As will be noted in Figure 1 of the drawings, the end of the sleeve 26 is provided with a circular groove 59 designed to accommodate a sealing ring 60 which may seal against the surface of the flange 9 when the valve is mounted in place.

In mounting the valve A upon the flange 9, bolts 61 are inserted through angularly spaced apertures 62 in the flange 54 and through aligned apertures in the flange 9 and the flange 54 is loosely connected to the flange 9. The valve A is next attached by inserting the sleeve 26 partially through the flange 54, the projecting lugs 55 and 57 being rotated out of registry. After the end of the sleeve 26 is abutted against the surface of the flange 9, the valve is rotated until the lugs 57 are engaged behind the lugs 55 on the flange 54. The bolts 61 are then tightened to clamp the end of the sleeve 26 against the end surface of the flange 9.

This construction has certain advantages. The arrangement has permitted the shortening of the body of the valve A due to the fact that it was previously necessary to have sufficient clearance between the valve body and the attachment flange to permit the insertion of the bolts 61 through the flange openings. Furthermore, it will be noted that the valve may be mounted in various angular relations with respect to the flange 9 and is adjustable in position within certain limits due to the length of the interlocked lugs. Furthermore, due to the fact that the flange is not integral with the housing of the valve, it may be produced of inexpensive material.

With reference now to Figures 1, 4 and 5 of the drawings, it will be noted that a plate 63 is bolted or otherwise secured as at 64 to the top of the valve housing 22. The plate 63 is provided with a pair of spaced projecting arms 65 and 66 which support bearings 67 and 69. Due to the fact that the bolts 64 are equally spaced and are at the same radius, the arms 65 and 66 may be mounted in various positions relative to the valve housing. A cylindrical member 70 is longitudinally slidably supported by the aligned bearings 67 and 69. The cylindrical member 70 is provided with spaced arcuate rack teeth 71 on the outer surface thereof, the rack teeth 71 extending substantially one-half of the circumference of the cylindrical member 70. The rack teeth 71 are in engagement with the teeth 72 of a gear segment 73 which is secured to the upwardly projecting end of the valve stem 21 by a pin 74 or other suitable connecting means. Thus, it will be seen that longitudinal movement of the cylindrical member 70 which forms an elongated cylindrical rack will rotate the gear segment 73 through an angle of 90°.

With reference now to Figures 6, 7 and 8 of the drawings, it will be noted that the cylindrical rack 70 is provided with a flat side 75 which is shown as being diametrically opposed to the center of the rack teeth 71. An angularly shaped spring plate 76 is bolted or otherwise secured as indicated at 77 to the arms 65 and 66 of the mounting plate 63, the spring 76 including a substantially horizontal base attaching portion 79 and a substantially vertical flange 80. When the cylindrical rack 70 is in the intermediate position indicated in Figure 6 of the drawings, the flange 80 of the spring 76 exerts little if any force against the rack. However, if the rack 70 is rotated either in a clockwise direction or a counterclockwise direction from the position shown in Figure 6, the flange 80 will exert a strong force against the outer cylindrical surface of the rack 70 causing high frictional force which will hold the rack from longitudinal movement. Figure 7 of the drawings shows the operating handle 81 which is connected to the rack 70 rotated in a clockwise direction from the position illustrated in Figure 6, and Figure 8 of the drawings shows the handle 81 rotated in a counterclockwise direction from the position shown in Figure 6. The rack is effectively locked from longitudinal movement in either of these positions.

It will also be noted that the valve element 10 may be rotated into open position either by a pulling movement or by a pushing movement depending upon the position of the gear segment 73 upon the valve stem 21. The valve may be operated in a partially opened position and locked in that position by a rotative movement of the handle 81 in either direction. The lock is released by merely rotating the handle to its intermediate position.

The operation of the valve has, for the most part, been described in conjunction with the description of the construction. When the ball valve element 10 is in the position illustrated in Figure 1 of the drawings, the valve is closed. If the inlet side of the valve is subject to pressure, this pressure acts against the inlet end of the inner sleeve 34 and acts to slide the connected sleeves 33, 34 toward the surface of the valve ball, thereby urging the seal 42 against the surface of the ball. When turned 90°, the passage 11 through the element 10 substantially registers with the cylindrical passage through the inner sleeve 34 and with the outlet sleeve 24 to permit a substantially unobstructed flow of fluid therethrough.

The valve is assembled by inserting the bearing 44 into its aperture 43. The ball valve element 10 is then inserted into the valve through the inlet end thereof with the sleeve 26 and associated mechanism removed. The stem 21 is angled upwardly through the opening 46 in the top of the valve and the valve ball is lifted sufficiently so that the small diameter end 16 of the boss 15 may be inserted into the bearing 44.

The plate 47 is next inserted over the valve stem 21 and slid down into position to close the top of the valve housing. The outer and inner sleeves 33 and 34 are assembled upon the sleeve 26 and this sleeve is then insert into the inlet passage 25. Bolts such as 29 are then inserted through the ears 27 on the sleeve 26 drawing the seal 42 toward the valve ball element 10.

The mounting plate 63 is then secured to the upper end of the valve housing by the bolts 64. The cylindrical rack 70 is then inserted in the bearings 67 and 69 and the gear segment 73 is engaged therewith and with the valve stem 21. The gear segment is pinned in place by the pin 74 and the valve is in readiness for mounting in the manner described.

In accordance with the patent statutes, I have described the principles of construction and operation of my improvement in discharge valve and operating mechanism, and while I have endeavored to set forth the best embodiment thereof, I desire to have it understood that changes may be made within the scope of the following claims without departing from the spirit of my invention.

I claim:

1. A ball type valve including a valve housing, a ball valve element rotatably supported in said housing and including a valve stem projecting from said housing and a passage extending therethrough perpendicularly to said valve stem, said housing having inlet and outlet passages therein communicating with said passage of the ball valve element when said element has been rotated to bring its passage into alignment with said inlet and outlet passages, a gear segment mounted on said valve stem exteriorly of said housing for rotating said ball valve element, a generally cylindrical rack supported for axial movement adjacent said gear segment and engaged therewith for operation in unison, said rack including arcuate teeth extending substantially one-half the circumference of said rack, said rack having a longitudinal flattened surface in its periphery, and spring means engageable with said rack, said spring means sliding in said flattened surface in one rotative position of said rack to permit said rack to move longitudinally, said spring means engaging the cylindrical surface of said rack upon rotation of said rack about its axis to frictionally hold said rack from longitudinal movement.

2. The construction described in claim 1 and in which said spring means is engageable with said cylindrical surface of said rack upon rotation of said rack about its axis in either direction from the position in which said spring means is in registry with said flattened surface.

3. The construction described in claim 1 and including a mounting plate secured to said valve housing and including a pair of spaced arms, bearings supported by said arms in axial alignment and on an axis parallel to the axis of said inlet and outlet passages, said bearings providing the means for rotatably and slidably supporting said rack.

4. The construction described in claim 3 and in which said spring means includes an L-shaped spring member including two angularly related spring flanges, means securing one of said spring flanges to said mounting plate, the other of said flanges being engageable with said rack.

5. An operating mechanism including a housing, an element rotatably supported in said housing, a gear segment mounted on said element for rotating same, a generally cylindrical rack supported for axial movement adjacent said gear segment and engaged therewith for operation in unison, said rack including arcuate teeth extending substantially one-half the circumference of said rack, said rack having a longitudinal flattened surface in its periphery, and spring means engageable with said rack, said spring means sliding in said flattened surface in one rotative position of said rack to permit said rack to move longitudinally, said spring means engaging the cylindrical surface of said rack upon rotation of said rack about its axis to frictionally hold said rack from longitudinal movement.

6. The construction described in claim 5 and including a mounting plate secured to said housing and including a pair of spaced arms, bearings supported by said arms in axial alignment, said bearings providing the means for rotatably and slidably supporting said rack.

7. The connstruction described in claim 6 and in which said spring means includes an L-shaped spring member including two angularly related spring flanges, means securing one of said spring flanges to said mounting plate, the other of said flanges being engageable with said rack.

References Cited in the file of this patent

UNITED STATES PATENTS

| | | |
|---|---|---|
| 270,323 | Mann | Jan. 9, 1883 |
| 338,302 | Richards | Mar. 23, 1886 |
| 437,915 | Costigan | Oct. 7, 1890 |
| 1,203,492 | Coleman | Oct. 31, 1916 |
| 2,665,879 | Housekeeper | Jan. 12, 1954 |
| 2,821,998 | Mayhew | Feb. 4, 1958 |
| 2,825,527 | Wendell | Mar. 4, 1958 |

FOREIGN PATENTS

| | | |
|---|---|---|
| 859,489 | France | June 3, 1940 |
| 126,685 | Australia | Jan. 28, 1948 |